US008335017B1

(12) United States Patent
Gil et al.

(10) Patent No.: US 8,335,017 B1
(45) Date of Patent: Dec. 18, 2012

(54) SPOT COLOR RENDERING VIA FEEDBACK-BASED MULTI-OBJECTIVE OPTIMIZATION

(75) Inventors: Alvaro Enrique Gil, Rochester, NY (US); Lalit Keshav Mestha, Fairport, NY (US); Wencheng Wu, Webster, NY (US); Edul N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/167,349

(22) Filed: Jun. 23, 2011

(51) Int. Cl.
H04N 1/46 (2006.01)
(52) U.S. Cl. .................. 358/1.9; 358/504; 358/518
(58) Field of Classification Search .......... 358/1.9, 358/518, 504; 382/162
See application file for complete search history.

(56) References Cited

U.S. PATENT DOCUMENTS

| | | | |
|---|---|---|---|
| 7,738,140 B2 | 6/2010 | Hancock et al. | |
| 2004/0032602 A1* | 2/2004 | Teraue | 358/1.9 |
| 2005/0094871 A1* | 5/2005 | Berns et al. | 382/162 |
| 2006/0139668 A1* | 6/2006 | Nishikawa | 358/1.9 |
| 2007/0024880 A1* | 2/2007 | Sato et al. | 358/1.9 |
| 2008/0043263 A1* | 2/2008 | Hancock et al. | 358/1.9 |
| 2008/0291479 A1 | 11/2008 | Mestha et al. | |
| 2008/0291480 A1 | 11/2008 | Mestha et al. | |
| 2009/0185208 A1* | 7/2009 | Yoshizawa et al. | 358/1.9 |
| 2009/0296154 A1 | 12/2009 | Donaldson et al. | |
| 2010/0080454 A1* | 4/2010 | Matsuo et al. | 382/162 |
| 2010/0085587 A1* | 4/2010 | Hayward et al. | 358/1.9 |
| 2010/0177366 A1 | 7/2010 | Mestha et al. | |
| 2011/0026053 A1* | 2/2011 | Gil et al. | 358/1.9 |

OTHER PUBLICATIONS

Gil et al., "Attribute Driven Gamut Mapping Via a Minimized Multi-Objective Cumulative Cost Function", U.S. Appl. No. 12/942,414, filed Nov. 9, 2010.
Wu et al., "Optimal Spot Color Recipes Using Variable GCR Profiles", U.S. Appl. No. 12/902,669, filed Oct. 12, 2010.
Wu et al., "Updating a Smoothness Constrained Cluster Model for Color Control in a Color Management System", U.S. Appl. No. 12/969,854, filed Dec. 16, 2010.
Mestha et al., "A Cluster Model for Controlling Color in a Color Marking Device", U.S. Appl. No. 13/023,202, filed Feb. 8, 2011.
J.C. Spall, "An Overview of the Simultaneous Perturbation Method for Efficient Optimization", Johns Hopkins APL Technical Digest, pp. 482-492, vol. 19, (1998).
Yoshi Ohno, "CIE Fundamentals for Color Measurements", Proceedings IS&T NIP16 Int. Conf. on Digital Printing Technologies, pp. 540-545, (Oct. 2000). G. Sharma, et al., "The CIEDE2000 Color-Difference Formula: Implementation Nodes, Supplementary Test Data, and Mathematical Observations", Color Research and Application, vol. 30, No. 1, (Feb. 2005).

* cited by examiner

Primary Examiner — Kimberly A Williams
(74) Attorney, Agent, or Firm — Philip E. Blair; Fleit Gibbons Gutman Bongini & Bianco P.L.

(57) ABSTRACT

What is disclosed is a feedback control based system and method for selecting spot color recipes for improved spot color rendition while simultaneously minimizing a function of image quality attributes formed with states defined as vectors such as $L^*$, $a^*$, $b^*$, mottle, graininess, etc. Color is measured with an in-line spectrophotometer or with a full/partial width array. If the sensor is not available, then a model of the print device is used to optimize the function of image quality attributes. In one example embodiment, a spot color of interest is selected along with a set of image quality attributes to be improved for the spot colors of interest. Set points for process actuators and color recipes of the color marking device are adjusted such that a function of the image quality attributes is minimized when the spot color is rendered on the device. Various workflows are disclosed.

22 Claims, 11 Drawing Sheets

(ONLINE APPROACH)

| Color # | Set-points | | | GA | | | | | | |
|---|---|---|---|---|---|---|---|---|---|---|
| | L* | a* | b* | L* | a* | b* | NMF | VS | VNHF | dE2K | JBest |
| 1 | 76.56 | 16.61 | 28.26 | 77.38 | 18.83 | 31.16 | 16.03 | 1.45 | 0.77 | 1.57 | 272.00 |
| 2 | 52.42 | -19.40 | 0.20 | 51.99 | -17.30 | 0.01 | 24.42 | 1.79 | 0.92 | 1.41 | 610.33 |
| 3 | 85.77 | 10.70 | 15.33 | 83.57 | 10.29 | 15.90 | 18.02 | 1.69 | 0.85 | 1.59 | 340.97 |
| 4 | 84.99 | 7.31 | 13.04 | 85.10 | 7.47 | 13.81 | 18.23 | 1.74 | 0.86 | 0.50 | 337.29 |
| 5 | 71.62 | 43.62 | 3.54 | 70.02 | 44.38 | 4.51 | 16.49 | 1.84 | 0.93 | 1.35 | 285.22 |
| 6 | 64.45 | 13.42 | 63.59 | 65.35 | 12.83 | 55.90 | 16.67 | 1.71 | 0.87 | 2.28 | 307.63 |
| 7 | 44.52 | 60.63 | 7.78 | 46.72 | 60.93 | 8.33 | 10.22 | 2.01 | 1.15 | 2.12 | 132.30 |
| 8 | 26.46 | 31.47 | -43.51 | 21.72 | 26.63 | -42.11 | 21.13 | 1.80 | 0.91 | 4.11 | 534.71 |
| 9 | 90.69 | -5.94 | 99.61 | 89.62 | -8.20 | 90.44 | 11.16 | 1.33 | 0.76 | 2.38 | 155.01 |
| 10 | 36.43 | 33.22 | 7.50 | 31.04 | 31.72 | 9.35 | 12.93 | 1.33 | 0.74 | 4.60 | 275.17 |

601 (Set-points), 602 (GA)

FIG. 6

| Color # | Set-points | | | | | | LM | | | | | | | |
|---|---|---|---|---|---|---|---|---|---|---|---|---|---|---|
| | L* | a* | b* | n | g | s | L* | a* | b* | n | g | s | dE2K | JT |
| 1 | 76.56 | 16.61 | 28.26 | 16.03 | 1.45 | 0.77 | 77.38 | 18.83 | 31.16 | 16.03 | 1.45 | 0.77 | 1.57 | 272.00 |
| 2 | 52.42 | -19.40 | 0.20 | 24.42 | 1.79 | 0.92 | 52.70 | -19.15 | 0.59 | 24.53 | 1.78 | 0.92 | 0.43 | 606.46 |
| 3 | 85.77 | 10.70 | 15.33 | 18.02 | 1.69 | 0.85 | 83.57 | 10.29 | 15.90 | 18.02 | 1.69 | 0.85 | 1.59 | 340.97 |
| 4 | 84.99 | 7.31 | 13.04 | 18.23 | 1.74 | 0.86 | 84.72 | 7.92 | 13.70 | 18.19 | 1.74 | 0.86 | 0.66 | 336.69 |
| 5 | 71.62 | 43.62 | 3.54 | 16.49 | 1.84 | 0.93 | 70.02 | 44.38 | 4.51 | 16.49 | 1.84 | 0.93 | 1.35 | 285.22 |
| 6 | 64.45 | 13.42 | 63.59 | 16.67 | 1.71 | 0.87 | 65.35 | 12.83 | 55.90 | 16.67 | 1.71 | 0.87 | 2.28 | 307.63 |
| 7 | 44.52 | 60.63 | 7.78 | 10.22 | 2.01 | 1.15 | 46.72 | 60.93 | 8.33 | 10.22 | 2.01 | 1.15 | 2.12 | 132.30 |
| 8 | 26.46 | 31.47 | -43.51 | 21.13 | 1.80 | 0.91 | 21.72 | 26.63 | -42.11 | 21.13 | 1.80 | 0.91 | 4.11 | 534.71 |
| 9 | 90.69 | -5.94 | 99.61 | 11.16 | 1.33 | 0.76 | 89.62 | -8.20 | 90.44 | 11.16 | 1.33 | 0.76 | 2.38 | 155.01 |
| 10 | 36.43 | 33.22 | 7.50 | 12.93 | 1.33 | 0.74 | 31.04 | 31.72 | 9.35 | 12.93 | 1.33 | 0.74 | 4.60 | 275.17 |

FIG. 7

| Set-points | | | GA | | | | | | | |
|---|---|---|---|---|---|---|---|---|---|---|
| L* | a* | b* | L* | a* | b* | n | g | s | dE2K | JT |
| 76.56 | 16.61 | 28.26 | 78.30 | 18.96 | 31.04 | 12.90 | 0.89 | 0.69 | 1.93 | 186.41 |
| 52.42 | -19.40 | 0.20 | 50.90 | -18.98 | 0.23 | 19.65 | 1.11 | 0.87 | 1.52 | 399.62 |
| 85.77 | 10.70 | 15.33 | 84.55 | 10.23 | 15.45 | 14.84 | 1.08 | 0.77 | 0.93 | 226.29 |
| 84.99 | 7.31 | 13.04 | 86.04 | 7.63 | 14.05 | 15.01 | 1.13 | 0.78 | 0.94 | 231.71 |
| 71.62 | 43.62 | 3.54 | 70.59 | 45.32 | 4.51 | 13.27 | 1.22 | 0.86 | 1.08 | 184.08 |
| 64.45 | 13.42 | 63.59 | 65.99 | 13.06 | 56.30 | 12.98 | 1.07 | 0.80 | 2.43 | 199.70 |
| 44.52 | 60.63 | 7.78 | 46.60 | 60.66 | 8.13 | 7.31 | 1.37 | 1.09 | 1.99 | 76.31 |
| 26.46 | 31.47 | -43.51 | 22.16 | 28.24 | -44.24 | 10.70 | 1.10 | 0.80 | 3.75 | 186.76 |
| 90.69 | -5.94 | 99.61 | 90.21 | -7.42 | 91.27 | 7.87 | 0.69 | 0.68 | 1.90 | 81.04 |
| 36.43 | 33.22 | 7.50 | 31.81 | 33.49 | 9.80 | 10.15 | 0.72 | 0.68 | 4.02 | 184.66 |

FIG. 8

| Color # | Set-points | | | | | | LQR | | | | | | | |
|---|---|---|---|---|---|---|---|---|---|---|---|---|---|---|
| | L* | a* | b* | n | g | s | L* | a* | b* | n | g | s | dE2K | JT |
| 1 | 76.56 | 16.61 | 28.26 | 12.90 | 0.89 | 0.69 | 78.30 | 18.96 | 31.04 | 12.90 | 0.89 | 0.69 | 1.93 | 186.41 |
| 2 | 52.42 | -19.40 | 0.20 | 19.65 | 1.11 | 0.87 | 52.34 | -19.43 | 0.17 | 19.62 | 1.11 | 0.86 | 0.08 | 386.83 |
| 3 | 85.77 | 10.70 | 15.33 | 14.84 | 1.08 | 0.77 | 84.55 | 10.23 | 15.45 | 14.84 | 1.08 | 0.77 | 0.93 | 226.29 |
| 4 | 84.99 | 7.31 | 13.04 | 15.01 | 1.13 | 0.78 | 86.04 | 7.63 | 14.05 | 15.01 | 1.13 | 0.78 | 0.94 | 231.71 |
| 5 | 71.62 | 43.62 | 3.54 | 13.27 | 1.22 | 0.86 | 70.59 | 45.32 | 4.51 | 13.27 | 1.22 | 0.86 | 1.08 | 184.08 |
| 6 | 64.45 | 13.42 | 63.59 | 12.98 | 1.07 | 0.80 | 65.99 | 13.06 | 56.30 | 12.98 | 1.07 | 0.80 | 2.43 | 199.70 |
| 7 | 44.52 | 60.63 | 7.78 | 7.31 | 1.37 | 1.09 | 46.60 | 60.66 | 8.13 | 7.31 | 1.37 | 1.09 | 1.99 | 76.31 |
| 8 | 26.46 | 31.47 | -43.51 | 10.70 | 1.10 | 0.80 | 22.16 | 28.24 | -44.24 | 10.70 | 1.10 | 0.80 | 3.75 | 186.76 |
| 9 | 90.69 | -5.94 | 99.61 | 7.87 | 0.69 | 0.68 | 90.21 | -7.42 | 91.27 | 7.87 | 0.69 | 0.68 | 1.90 | 81.04 |
| 10 | 36.43 | 33.22 | 7.50 | 10.15 | 0.72 | 0.68 | 31.81 | 33.49 | 9.80 | 10.15 | 0.72 | 0.68 | 4.02 | 184.66 |

FIG. 9

SPOT COLOR RENDERING VIA FEEDBACK-BASED MULTI-OBJECTIVE OPTIMIZATION

TECHNICAL FIELD

The present invention is directed to systems and methods which utilize a feedback control loop to minimize a set of image quality attributes identified for a selected spot color of interest for accurate spot color rendition using a target color marking device.

BACKGROUND

To meet customer demand, the commercial printing industry requires the capability of producing spot colors and color images accurately and consistently. In a typical four color CMYK printer, when rendering a given color (Lab) on a CMYK printer, such as for spot color emulation, there is a range of CMYK values that will produce the desired Lab value. The available CMYK range is large for some colors (e.g., mid-tone neutrals) and small or zero for others (e.g., saturated colors). Although each CMYK value in the range will produce the desired Lab value, the printed spot colors with that recipe can differ widely in other attributes, such as graininess, mottle, color stability, ink cost, etc. Consequently, it is desirable to pick the CMYK recipe from among available recipes to optimize image quality. Methods for performing this optimization are computationally intensive since such techniques involve computing all possible CMYK recipes for a given color and then selecting among these. Depending on the choice of CMYK recipe, appearance of spot colors may be noisy due to the differences in uniformity and in contrast between the various separations, for example. In spot color tests on several printers, proper selection of the C, M, Y and K separations has been shown to suppress the noise apparent in the prints, making them appear smooth. An optimized CMYK recipe is considered useful when it not only produces accurate color but also renders colors that appear smoother (less noisy).

Prior art methods use open-loop multi-objective optimization which may or may not contain optimal values. While such a use is known, there is a need for a feedback-based approach which simultaneously minimizes multiple image quality attributes. Although the CMYK recipe and process actuators can be simultaneously searched in order to improve image quality in color rendition, optimization can only be performed on a single color at a time. As such, there is a need to setup the process actuators to an optimal image quality attribute set point so that a majority of the CMYK colors are printed near optimal for a selected image quality attribute.

Accordingly, what is needed in this art is a feedback control loop which simultaneously minimizes image quality attributes for selected colors of interest.

INCORPORATED REFERENCES

The following U.S. Patents, U.S. Patent Applications, and Publications are incorporated herein in their entirety by reference.

"Attribute Driven Gamut Mapping Via A Minimized Multi-Objective Cumulative Cost Function", U.S. patent application Ser. No. 12/942,414, by Gil et al.

"Optimal Spot Color Recipes Using Variable GCR Profiles", U.S. patent application Ser. No. 12/902,669, by Wu et al.

"Updating A Smoothness Constrained Cluster Model For Color Control In A Color Management System", U.S. patent application Ser. No. 12/969,854, by Wu et al.

"A Cluster Model For Controlling Color In A Color Marking Device", U.S. patent application Ser. No. 13/023,202, by Mestha et al.

"Image-Based Color Printer Fractal Gamut Extensions Achieved With Process Set Point Adjustment", US Patent Publication No. 20080291480, to Mestha et al.

"Spot Color Printing With Non-Standard Gamuts Achieved With Process Set Point Adjustment", US Patent Publication No. 20080291479, to Mestha et al.

"*An Overview of the Simultaneous Perturbation Method for Efficient Optimization*", J. C. Spall, Johns Hopkins APL Technical Digest, Vol. 19, pp. 482-492, (1998).

"*Linear Systems*", Thomas Kailath, Prentice-Hall, Inc. (1980), ISBN-13: 978-0135369616.

"System And Method For Automated Spot Color Editor", U.S. Pat. No. 7,738,140.

"*CIE Fundamentals for Color Measurements*", Yoshi Ohno (Author), Proceedings IS&T NIP16 Intl. Conf. on Digital Printing Technologies, pp. 540-545 (October 2000).

"*The CIEDE2000 Color-Difference Formula. Implementation Nodes, Supplementary Test Data, and Mathematical Observations*", G. Sharma, W. Wu, E. N. Dalal, Color Research and Application, Vol. 30. No. 1, (February 2005).

BRIEF SUMMARY

What is disclosed is a novel feedback control based system and method for minimizing an image quality attribute function formed with states defined as vectors. In one example embodiment, a set of spot colors of interest is selected along with a set of image quality attributes desired to be improved for the selected spot colors on a target color marking device. Set points for process actuators and color recipes for a target color marking device are adjusted such that a function of the image quality attributes is minimized when the selected spot colors of interest are rendered on the target device. Color is measured with an in-line spectrophotometer system (ILS) or with a full/partial width array sensor. Advantageously, feedback-based minimization effectuates both stability and optimality. The teachings hereof are applicable to both iterating on the printer or on a printer model. Various workflows are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which:

FIG. 6 is a table showing results obtained using GA algorithm to minimize the global cumulative cost $J_T$;

FIG. 7 is a table of results obtained using LM algorithm to minimize the global cumulative cost $J_T$ followed by gradient descent algorithm;

FIG. 8 is a table of results obtained using GA algorithm to minimize the global cumulative cost $J_T$ using 6 inputs;

FIG. 9 is a table of results obtained using LQR controller to minimize cumulative cost $J_T$ using 6 inputs;

DETAILED DESCRIPTION

Figure 1:
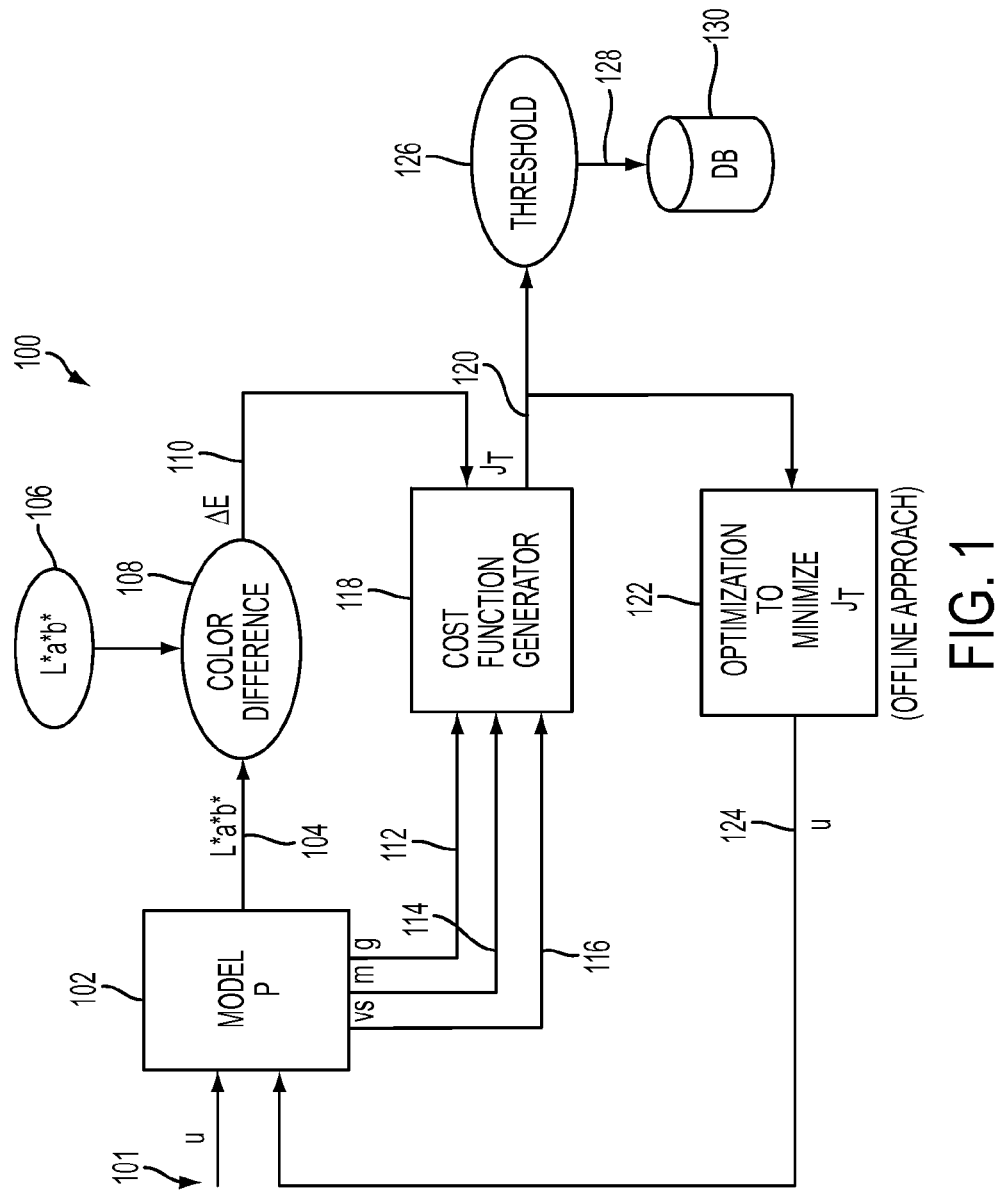
FIG. 1 is a block diagram of one example embodiment of an optimization used for initializing a solution to be used by a control system of a color marking device.

It should be understood that one of ordinary skill in this art should be readily familiar with the various aspects of spot colors and spot color recipes, process actuators and associated set points, and various aspects of color manipulation in a color management system. Those of ordinary skill in this art would be familiar with the text: *"Digital Color Imaging Handbook"*, 1st Ed., CRC Press (2003), ISBN-13: 9780849309007, *"Control of Color Imaging Systems. Analysis and Design"*, CRC Press (2009), ISBN-13: 9780849337468, *"Principles of Color Technology"*, Roy S. Berns, Wiley-Interscience, 3$^{rd}$ Ed. (2000), ISBN-13: 9780471194590, and *"Principles of Color Reproduction"*, John Yule and Gary Field, Graphic Arts Technical Foundation Press, 2$^{nd}$ Ed. (2001), ISBN-13: 9780883622223, all of which are incorporated herein in their entirety by reference.

NON-LIMITING DEFINITIONS

A "device-independent color space" is any standard color space that is commonly used to define or describe color, e.g. CIE XYZ, CIE L*a*b*, CIE L*u*v*, sRGB etc.

A "device-dependent color space" is a color space that is non-standard and cannot be used to commonly define colors without additional information such as the characteristics of the rendering device. For example, the commonly used CMYK color space for 4-color printers is a device-dependent color space since the rendering of a given CMYK color could yield very different (device-independent) colors from one model of a printer to another model of a printer.

A "color separation" refers to an individual separation corresponding to one of the colorants of a target marking system. For example, there are 4 separations: C, M, Y, K for a 4-color CMYK printer. Combinations of all color separations can be used to produce a range of colors by the target marking system.

A "spot color", as used herein, refers to any color generated by a single ink, which can be printed as a single separation. Spot colors are often used for company logo colors. They can also be used for large background areas, which can be very color critical. Consistent and accurate color in spot colors may determine the difference between success and failure in meeting customer requirements. Spot color classification systems include: Pantone®, Toyo, DIC, ANPA, GCMI, and HKS.

A "color of interest" refers to one or more spot colors in a library of spot colors, and is also intended to include non-standard spot colors that may be defined by hardcopy samples which may have been printed using any printing technology such as, for example, offset lithography, gravure, flexography, xerography, inkjet, etc. A color of interest is intended to also encompass one or more colors at the vertices of a gamut of the color marking device such that the overall gamut volume is not reduced.

A "color recipe" defines the combination of process colors (e.g., CMYK or CMYKOV) which can be used to emulate a color. Spot colors in an N-color printing system ($N \geq 4$) are typically rendered with a Gray Component Replacement (GCR), since some colors can be rendered by any of several different recipes.

A "printer model" converts values in a target color space to values in a device-independent color space. A printer model can have the form of a four-input to three-output look-up table (LUT) which can be updated using well-established techniques such as those described in Chapter 7 of the above-incorporated text: *"Control of Color Imaging Systems. Analysis and Design"*.

An "image quality attributes model" is a function which relates color recipes and process parameters to image color and a set of image quality attributes for a given color marking device.

A "process parameter" refers to a device setting used to adjust or otherwise modify one or more operational processes, controllers, or workflows for color management in a digital document reproduction device. Example process parameters include: photoreceptor voltages (charged and/or discharged voltages), donor and/or magnetic roll voltages, fuser temperature, transfer current, and toner concentration.

A "process set point" refers to one or more process parameters which regulate the operational function of a marking engine in a color marking device. The actual available color gamut for a particular image forming device depends on colorants of the pigments and is also a function of the set points for certain process parameters of each of the color separations. Combinations of set points thus define limits to the color gamut of the device by limiting the developed color combinations that are available from specific mass levels of each of the primary colorants.

A "device-dependent colorant actuator" refers to a set of color recipes in color digital printers, as is normally understood in this art.

An "image quality attribute" is a mathematical representation of a given image quality defect and may further include ink cost. An image quality attribute can also describe the underlying variation of raw color data from which higher level image quality metrics can be derived. Example image quality metrics are described in: International Print Quality Standard—ISO/IEC 13660:2001 which specifies device-independent image quality metrics, measurement methods, and analytical procedures used to describe a quality of an image output produced by a color marking device. A set of image quality attributes includes color error and at least one of: graininess, mottle, and color stability.

"Mottle" refers to undesirable non-uniformity of color on an output print. Such irregularities may be due, for example, to defective toner transfer from the belt to the image forming surface. Mottle is similar to graininess but on a larger spatial scale (>250 µm). Various metrics have been developed by vendors, some proprietary, which are used to determine lightness variation of mottle. ISO-13660:2001 defines mottle as the Standard Deviation (STD) of Optical Density (OD) between $1.27 \times 1.27$ mm$^2$ and $12.7 \times 12.7$ mm$^2$ scale over a defined spatial frequency. Xerox defines NMF, a measure of mottle, as the standard deviation of L* (together with an OD correction) between $1.1 \times 1.1$ mm$^2$ and $5.5 \times 5.5$ mm$^2$ scale.

"Graininess", as defined by ISO 13660, is the aperiodic fluctuation of density at a spatial frequency typically greater than 0.4 cycles per millimeter in all directions. Other definitions, such as with different spatial frequency ranges and/or measuring fluctuation at different color space (e.g. L* rather than density), exist as well. Methods to quantify graininess are well established.

"Color stability" refers to a characteristic of a multi-color printer that characterizes output color variations for a given device-dependent color specification over one or more of: time, across different output devices, and/or across different portions of an output image. Different types of color stability are able to be characterized and modeled across an output color gamut of device-dependent color specifications. Each device-dependent color specification has a color stability value for each type of color stability of interest. Different color stability values are able to be determined for a particular device-dependent color specification to reflect, for example, within-image color stability and within-job color stability. Similarly, color stability values for a particular device-dependent color specification can be determined for different images that were created at respective times that contain that particular device-dependent color specification and that are separated by various amounts of time and/or various amounts of intervening images having been produced. Color stability is also able to be characterized for an individual printer or for a family or other population of printers. Various color stability models for the device-dependent color specifications within an output device's gamut are able to be characterized to better represent the output performance of that device over, for example, short/single page jobs, different printers, or long print runs.

A "color marking device" is intended to refer to a wide variety of digital imaging systems which includes monochrome or color digital document reproduction architectures, printers/copiers, digital printing presses, and other multi-function document reproduction devices. Such systems generally include a display device such as a CRT or touch screen along with one or more user interfaces such as a keyboard, mouse, keypad, touchpad, and the like, for entering data and configuring device-specific settings to optimize image quality and performance. Such complex devices further incorporate an image processing or color management system for processing image data.

A "function of image quality attributes", as used herein, comprises a weighted sum of the individual cost functions associated with image quality attributes desired to be improved for the i$^{th}$ color. In one embodiment, the function of image quality attributes for the i$^{th}$ color is given by:

$$J^i_T = \Sigma_e [w^i_e \cdot (J^i_e - J^{id}_e)^2] \quad (1)$$

where $J^{id}_e$ represent the desired costs to be achieved for the i$^{th}$ color, $w^i_e$ are weights assigned to each individual cost depending on the image quality attributes selected for the i$^{th}$ color, and $J^i_e$ are the costs associated with each image quality attribute selected for the i$^{th}$ color. Various embodiments hereof are directed towards minimizing $\|J_T\|$ where $J_T$ is a vector containing individual cost functions $[J^1_T, J^2_T, \ldots, J^M_T]$ for M colors of interest requiring improvement with respect to the selected set of image quality attributes.

GENERAL DISCUSSION

Let $u_j$ be the j$^{th}$ element of an input vector u that contains M elements. Given vector u, model P estimates an output vector X that contains Q elements. For instance, applying vector u=[C, M, Y, K] to model P produces X=[L*, a*, b*, g, m, vs] where L*a*b* are estimated color values and g, m, and vs represent an estimated level of graininess, mottle (quantified as NMF), and visual screens, respectively. Let $J_a$ denote the cost of representing a given color accurately. Let $J_g$, $J_m$, and $J_{vs}$, be the costs associated with graininess, mottle, and visual screen, respectively. The objective is to find a vector u which, when applied to model P, minimizes a global cumulative cost function, $J_T$, given by:

$$J_T = [w_a \cdot (J_a - J^d_a)^2] + [w_g \cdot (J_g - J^d_g)^2] + [w_m \cdot (J_m - J^d_m)^2] + [w_{vs} \cdot (J_{vs} - J^d_{vs})^2] \quad (2)$$

where $w_a$, $w_g$, $w_m$, and $w_{vs}$ are positive weights assigned to each cost, and $J^d_a$, $J^d_g$, $J^d_m$, and $J^d_{vs}$ are the costs desired to be achieved for each image quality attribute.

Example Feedback Control System

Reference is now being made to the block diagram 100 of FIG. 1 which illustrates one embodiment of an optimization used for initializing a solution to be used by a control system (of FIG. 3) of a printer. The feedback controller of FIG. 1 can also be used as a final solution when only a model of the printer is available.

In FIG. 1, printer model 102 receives a vector u comprising, in part, a set of initial CMYK values and generates a set of L*a*b* values 104 and image quality attributes g, m, vs at 112, 114, and 116, respectively. L*a*b* values 104 are provided to color difference generator 108. Generator 108 determines a color difference between a set of target L*a*b* values 106 and L*a*b* values 104. The difference 110 (shown as ΔE) produced by difference calculator 108 can be viewed as the cost $J_a$ of not accurately representing vector u 101 on a first iteration, and can be viewed as the cost of not accurately representing vector u 124 on successive iterations. The selected set of image quality attributes (112, 114, and 116) and color difference 110 are provided to cost function generator 118 which determines the global cumulative cost $J_T$ 120. For each iteration, threshold 126 determines whether a desired level of accuracy has been achieved or a maximum number of iterations has been reached. If so, then module 126 stores $J_T$, device-dependent colorants, and the target image quality attributes g, m, and vs (in this example shown collectively at 128) to storage device 130 and the feedback loop stops processing. On each iteration, optimization block 122 receives cost $J_T$ 120 and drives total cumulative cost $J_T$ to a minimum, and outputs vector u 124. Vector u 124 is provided as feedback to model 102 for the start of a next iteration. The feedback loop continues until the threshold 126 condition(s) have been met. It should be appreciated that various process set points need to be modified for the target color such that a solution u* which is an actuator vector containing set points used to iterate on a real printer to improve costs. This embodiment is discussed in FIG. 3.

Example Flow Diagram of Embodiment of FIG. 1

Figure 2:
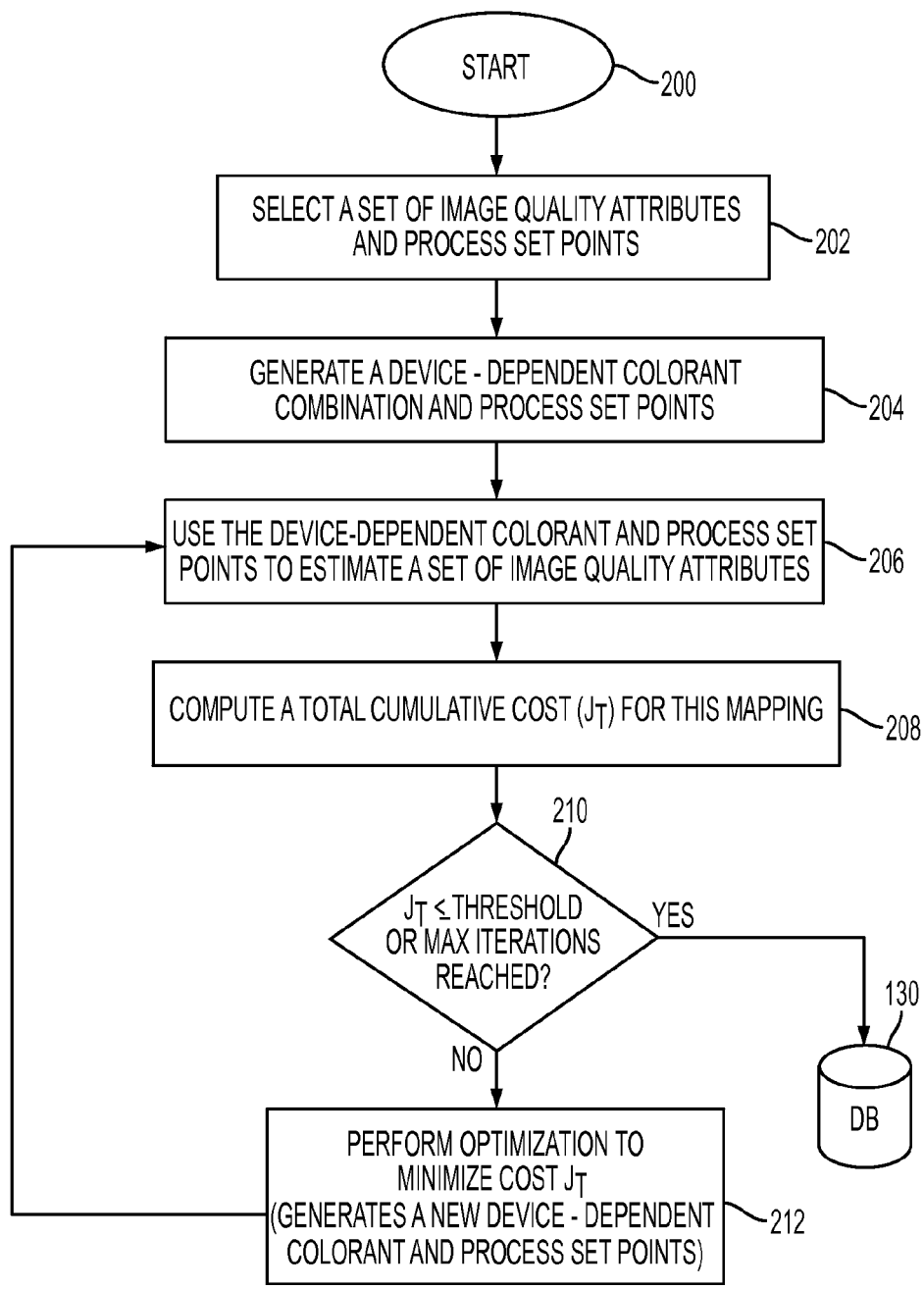
FIG. 2 is a flow diagram which illustrates the flow processing of the controller of FIG. 1.

Reference is now being made to the flow diagram of FIG. 2 which further illustrates the flow processing of the feedback controller of FIG. 1. Flow processing begins at step 200 and immediately proceeds to step 202.

At step 202, a set of image quality attributes and process set points are selected.

At step 204, a device-dependent colorant and process set points combination is generated.

At step 206, the device-dependent colorant and process set points are used as input to a model which estimates the set of individual image quality attributes. Alternatively, the set of image quality attributes are determined by a process of printing the device-dependent colorants and measuring the printed colors.

At step 208, a total cumulative cost ($J_T$) is computed for this mapping.

At step 210, a determination is made whether the total cumulative cost has reached an acceptable threshold level or whether a maximum number of iterations have occurred. If not then, at step 212, an optimization is performed to minimize $J_T$. A result of this is a new device-dependent colorant combination (CMYK) and process set points. Processing repeats with respect to step 206 wherein the new device-dependent colorant and process set points are generated and a new cumulative cost computed. The new cumulative cost is then compared against the threshold. The process repeats in such a manner until the threshold conditions (of step 210) has been met or a maximum number of iterations have occurred. Thereafter, the total cumulative cost $J_T$, the device-dependent colorant, process set points, and the set of image quality attributes are stored to storage device 130.

Block Diagram of Printer Control System

Figure 3:
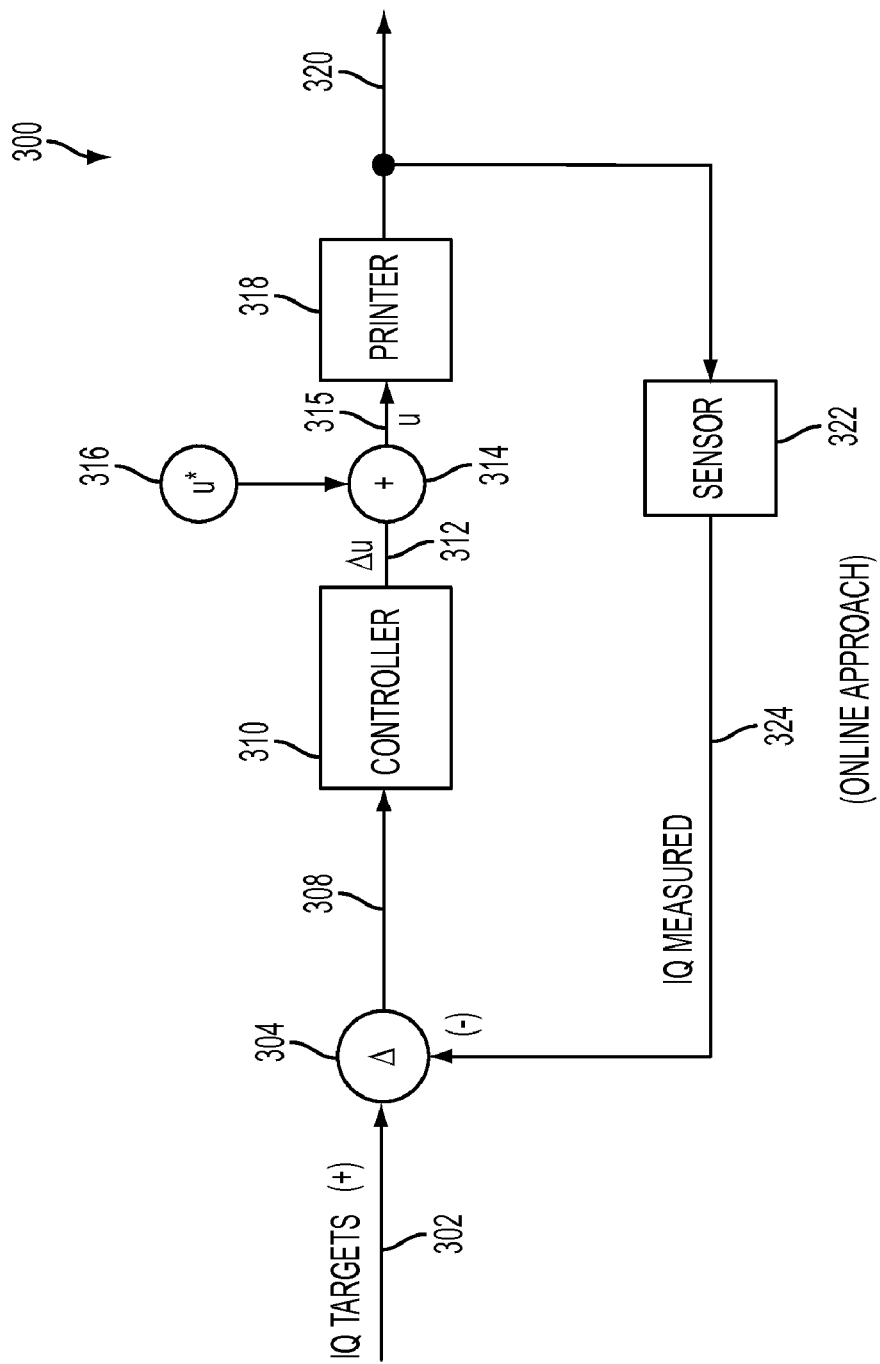
FIG. 3 is a block diagram of an embodiment that can be applied directly to a printer whenever there is a sensor available that can obtain measurements needed by the controller.

Reference is now being made to the control system of FIG. 3 which is a block diagram 300 of an embodiment that can be applied directly to a printer whenever there is a sensor available that can obtain image quality attributes needed by the controller.

In FIG. 3, as set of IQ targets 302 for a given color of interest are provided to difference generator 304. Example IQ Targets can be, for example, [L* a* b* g, m, vs]. Difference calculator 304 determines a difference 308 between initial IQ targets and IQ measured values 324. Controller 310 receives the difference 308 and generates an amount of an adjustment (Δu) 312 to be made to the initial set points u* 316. Adder 314 adds the controller's determined amount of adjustment to the initial solution set u* (of FIG. 1) and provides those new adjustments u 315 to color marking device 318. Printer 318 prints one color patch 320 which are measured by sensor 322. Sensor 322 can be an inline or offline color and/or IQ measurement device as are known in this art. Sensor 322 outputs IQ measured values 324 for the selected set of image quality attributes. These are then provided to 304 wherein, on a next iteration, another solution is determined by controller 310. The process continues for a determined number of iterations or if the printed color(s) have reached an acceptable level of quality. It is important to note that the actuator vector u contains both device-dependent colorant actuators and process actuators. Process actuators cannot be changed on an individual spot color basis, unless some customers are very keen on one spot color to be optimized (which is often the case for some color critical customers). Therefore, some constraints/trade-offs need to be made when including process actuators in the optimization for a group of spot colors of interest. The input and output vectors can be expanded to co-optimize the entire group of colors with individual device-dependent colorant actuators (CMYK) and common process actuators. It should be appreciated that the dimensionality may quickly get large when the group size is big.

Another embodiment hereof iteratively optimizes a two-level control scheme where the outer loop uses the common process actuators and the inner loop uses the individual device-dependent colorant actuators. The cost function for inner loop is the same as Eq. (3), while the cost function for the outer loop can be as simple as the sum of all $J_T$ for the inner loop or a weighted sum based on the "importance" of each spot color in the group. Such embodiments are intended to fall within the scope of the appended claims.

Setting Optimal Process Set Points

One drawback of this approach however is that optimization can only be done on a single color at a time. So, there is a need to setup the process actuators at optimal image quality attribute set point so that majority of the colors are printed near optimal for image quality attribute. What is described next is a method to determine optimal process set points for improved image quality attribute in rendering color images. An image quality attribute is measured in terms of a selected set of image quality parameters such as mottle, halftone noise, graininess as described above.

In this embodiment, a method for optimal process setup is achieved using an image quality attributes model of the process. We construct an image quality attributes model as a function of device-dependent colorant values (CMYK) and process parameters. An L12 screening design can be used to create the parametric model. This embodiment comprises two steps: (1) Determination of most sensitive colors that have the highest sensitivity to image quality attributes using the model; and (2) Calculation of the optimal process set points using any of the known optimization algorithms (multiple response optimizer or parametric optimization algorithm).

Critical Color Determination (Step 1)

To identify critical colors, first a model relating CMYK and process parameters (as actuators) to image quality attributes (as response) is built. Then, for each of the group of colors of interest (e.g. all in-gamut colors~560 colors for a digital color printer out of the list of PANTONE® formula guide solid coated colors), using a color model to exhaustively search all CMYK combinations that can yield the target L*a*b* under various combinations of process set points. And passing these CMYK combinations to the image quality attributes model with their corresponding process set points to identify the predicted image quality attributes range available (the higher image quality attribute value ranges are, the more sensitive the colors are to process set points) for the given color. Then, rank order the colors in the group based on the image quality attributes range available to pick out the top N (e.g. 10) critical colors for processing in the next step. Note that the group of colors can also be a uniformly sampled set of colors of in-gamut L*a*b* colors. Additional colors may be included based on the need, for example, colors located at the vertices of the gamut, so that the overall gamut volume is not reduced during step (2).

Calculating Optimal Process Set Points (Step 2)

Here we discuss how to derive process set points using multiple objective cost functions to improve image quality attributes when rendering spot colors. A two-step approach (steps A/B) will next be described where the process actuators will be optimized first (step A) to improve image quality attributes using fixed colorant recipes. The second (step B) is applied to search for modifications on the colorant recipes, keeping fixed the process actuators obtained in the first step, to improve image quality attributes for a set of colors. This is described next:

Optimizing Process Actuators (Step A)

Let u be an input vector that contains 5 elements. Let P define the model that estimates the output x given the input vector u. For this case, x is the vector [L* a* b* m] when the input vector u=[ETAC, FuseTemp, XferCurrent, TC, TA] is applied to the model P (ETAC is toner area coverage, Fuse-Temp is fuser's temperature, TC is toner concentration, TA is Toner Age). The variable m represents the level of image quality attribute (in this case mottle, represented by NMF, as the image quality attribute parameter when the input vector u is used). Note that P could also be used for a real printer. Let $J^i_a$ denote the cost of not representing color accurately of the $i^{th}$ spot color. Let $J^i_m$ be the cost of indicating the level of mottle quantified as NMF. A cumulative cost function $J^i_T$ for each color of interest i can be defined as:

$$J^i_T = w^i_a \cdot (J^i_a)^2 + w^i_m \cdot (J^i_m)^2 \quad (3)$$

where $w^i_a$ and $w^i_m$ are positive weights assigned to each individual cost and colors. Other factors can be added to Eq. (3) depending on the image quality attributes of interest.

Suppose that there are M spot colors requiring image quality attributes improvement. Let $J_T = [J^1_T, J^2_T, \ldots, J^M_T]$ be the vector that contains the cumulative cost values. An optimization problem can be formulated as: (a) Find u*, and (b) Minimize $\|J_T\|$ such that $L \leq u \leq H$ where L and H are lower and upper bounds for each element contained in the vector u and the operator $\|\bullet\|$ denotes the norm of the vector. This optimization is performed while all the colorant recipes are fixed.

Optimizing Colorant Recipes (Step B)

Let $u^i_c$ be an input vector that contains 4 elements. Let $P_c$ define the model that estimates the output $x^i_c$ given the input vector $u^i_c$. For this case, $x^i_c$ is the vector $[L^*_i\, a^*_i\, b^*_i\, m_i]$ when the input vector $u^i_c = [C^i\, M^i\, Y^i\, K^i]$ is applied to the model $P_c$. Note that $P_c$ could also be used for a real printer. A cumulative cost function $J^i_T$ for each color of interest i can be defined as in Eq. (3) such that the optimization problem becomes: (a) Find $u^i_c$, and (b) Minimize $J^i_T$ such that $0 \leq u^i_c \leq 255$, where the process actuators input is globally fixed for this case to the input obtained above, i.e., u*.

Flow Diagram of Example Embodiment

Figure 4:
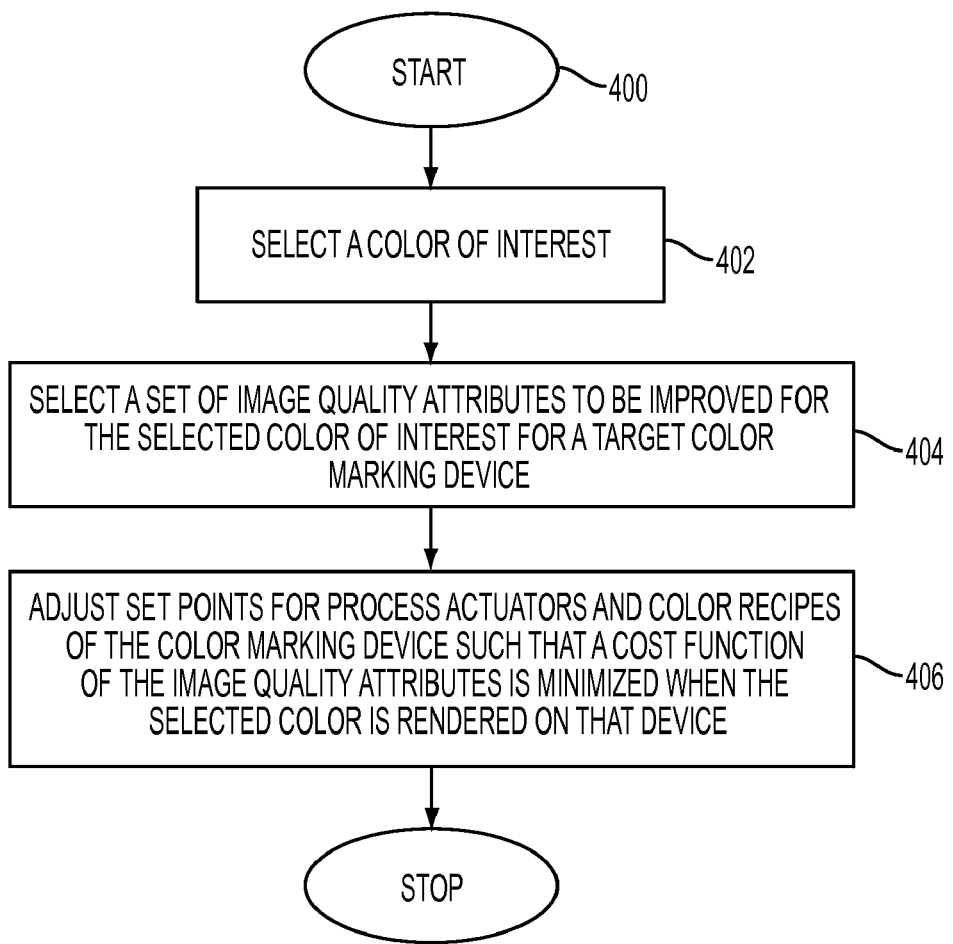
FIG. 4 illustrates one example embodiment of the present method for improving image quality in a color marking device.

Reference is now being made to the flow diagram of FIG. 4 which illustrates one example embodiment of the present method for improving image quality in a color marking device. The method begins at step 400 and processing immediately proceeds to step 402.

At step 402, a set of spot color of interest is selected. The set of spot colors of interest can be one or more spot colors from a library of spot colors and may also include non-standard spot colors defined by hardcopy samples which may have been printed using a printing technology such as, for example, offset lithography, gravure, flexography, xerography, inkjet, etc. The selected color set of interest has one or more colors at the vertices of a gamut of the color marking device such that the overall gamut volume is not reduced. A user may use a computer workstation to select the color set of interest or these may be received from a remote device over a wired or wireless network. In one embodiment for selecting the colors of interest is shown and discussed with respect to the flow diagram of FIG. 5.

Figure 5:
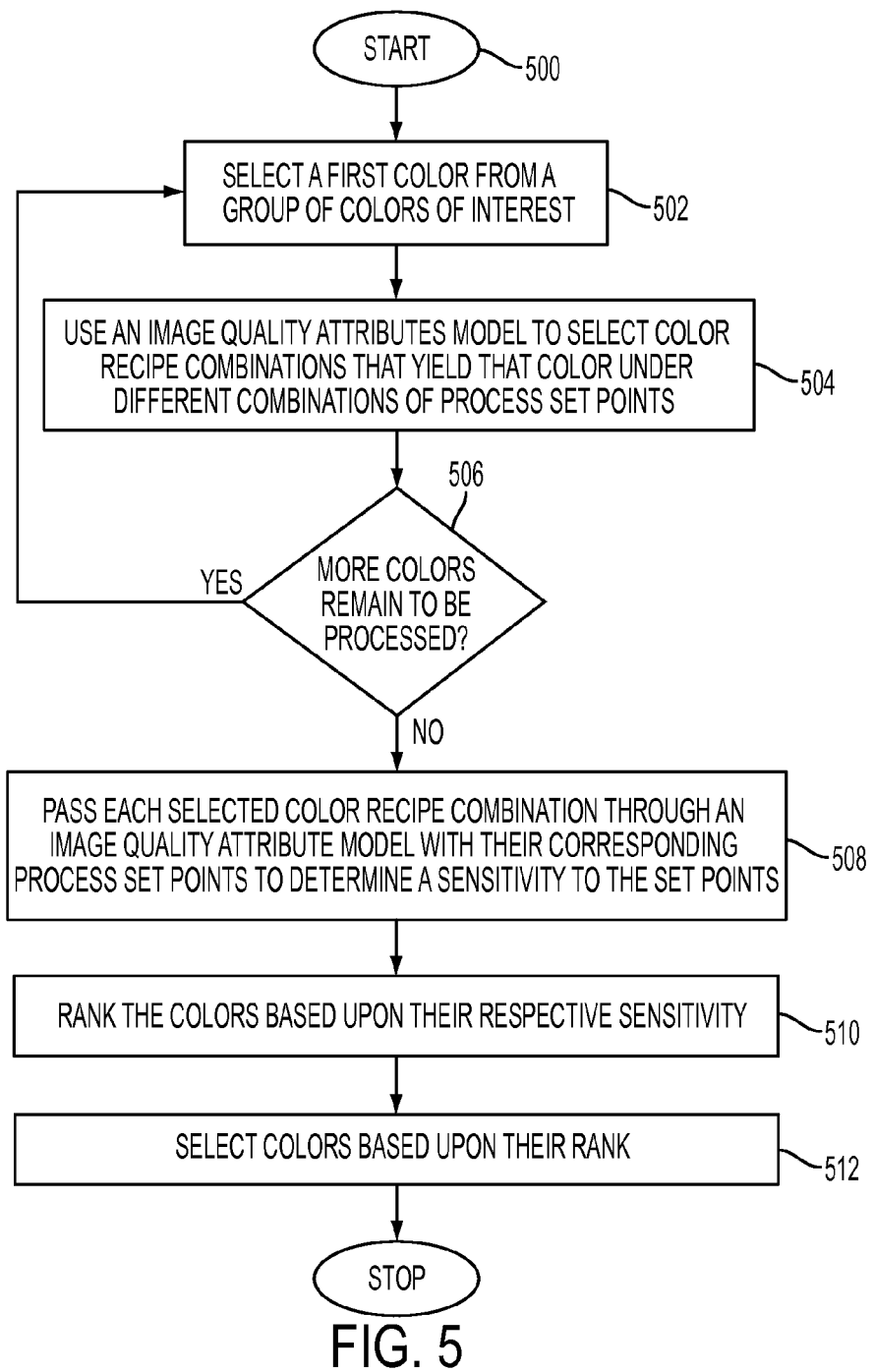
FIG. 5 illustrates one example embodiment for selecting the colors of interest, as discussed with respect to step 402 of FIG. 4.

Reference is now being made briefly to the flow diagram of FIG. 5 which illustrates one example embodiment for selecting the colors of interest, as discussed with respect to step 402 of FIG. 4. Flow processing beings at step 500 and immediately proceeds to step 502.

At step 502, a first color is chosen from a group of colors of interest. In one embodiment, the group of colors of interest comprises a uniformly sampled set of in-gamut colors. In another embodiment, the group of colors comprises colors at the vertices of a gamut of the color marking device such that the overall gamut volume is not reduced.

At step 504, a color and process set points model is used to select all color recipe combinations that yield that color under different combinations of process set points.

At step 506, a determination is made whether any more colors remain to be processed from the group of colors of interest. If so, then processing repeats with respect to step 502 wherein a next color is obtained from the group of colors of interest. For this next color, a color and process set points model is again used to select all color recipe combinations that yield this color under different combinations of process set points. The process repeats for the next color until all color in the group of colors of interest have been processed accordingly and recipe combinations have been selected for each color.

At step 508, each of the selected color recipe combinations are passed through the image quality attributes model with their corresponding process set points to determine a sensitivity of the image quality attributes to the process set points.

At step 510, the colors are ranked based on each color's sensitivity as determined in step 508.

At step 512, a subset of the colors is selected based upon the ranking of the smoothness range. These colors become the selected colors of interest.

Reference is again being made to the flow diagram of FIG. 4.

At step 404, a set of image quality attributes are selected which are desired to be improved for the selected color of interest. In various embodiments hereof, the set of image quality attributes includes color error and at least one of: graininess, mottle, and color stability. It should be appreciated that other image quality attributes may also be selected to be improved for the color of interest. Such additional attributes are intended to fall within the scope of the appended claims.

At step 406, set points for process actuators and color recipes of the color marking device are adjusted such that a cost function of the image quality attributes is minimized when the color of interest is rendered on the color marking device. The process set points can be, for instance, photoreceptor voltages, donor and magnetic roll voltages, fuser temperature, transfer current, toner concentration, media, and halftones. In various embodiments, adjusting the process set points and the color recipes comprises using a color and an image quality attributes model which relates color recipe values and process actuators to image color and the image quality attributes. The function of image quality attributes, in one embodiment, comprises a weighted sum of the individual functions of image quality attributes desired to be improved for the $i^{th}$ color of interest, as described above with respect to Eq. (1). Thereafter, in this embodiment, further processing ends.

It should be understood that the flow diagrams depicted herein are illustrative. One or more of the operations illustrated in any of the flow diagrams may be performed in a differing order. Other operations may be added, modified, enhanced, condensed, integrated, or consolidated. Variations thereof are intended to fall within the scope of the appended claims. All or portions of the flow diagrams may be implemented partially or fully in hardware in conjunction with machine executable instructions in communication with various components of such a system.

Performance Results

Let solution vector u=[C M Y K]. We used a model P to estimate the output vector X=[L* a* b* g m vs]. We use Eq. (2) as the multi-objective cost function for optimization with weights: $w_a=5$, $w_g=5$, $w_m=w_{vs}=1$ so more emphasis is put on color accuracy $J_a$. The cost of accurately reproducing the color of interest, $J_a$ is the deltaE2000 formula. $J_g$ is the level of graininess. $J_m$ is the mottle's level. $J_{vs}$ is the visual screen level. Initially we set our desired cost objectives at: $J^d_a = J^d_g = J^d_m = J^d_{vs} = 0$. We use genetic algorithms (GA) to seek a solution vector u* that will minimize the global cumulative cost function $J_T$ for a group of 10 spot colors of interest. The solution obtained for this case is shown in the Table of FIG. 6. The columns 601 show the desired L*a*b* reproduced when accuracy is the only concern. Due to the selection of $J_T$, the results obtained are shown under the columns 602. Note that colors 8 and 10 do not achieve good deltaE2000 numbers.

Next, we define the set points for each spot color by merging the L*, a*, and b* values from the columns 601 along with the NMF, VS, and VNHF values obtained from GA (of FIG. 6). In addition to that, we use the results u* obtained by GA as an initial point for a control algorithm, Levenberg-Marquardt (LM) method, to try to improve on the previous results. The new cumulative cost $J_T$ value for each color is then compared to the one obtained using GA. Comparisons are made for each iteration. If this is less than the threshold, the new solution, $u^*_{LM}$, is stored, otherwise, the new solution is discarded and a new iteration is performed until the maximum number of iterations, 20, is reached. The Table of FIG. 7 shows the results. It can be observed that cost $J_T$ for colors 2 and 4 is improved. The reason why the performance for other colors has not been improved is because we were using the same model for both cases, LM and GA, so that GA happened to find a minimum value that the LM algorithm could not. This will be different when LM is implemented on a printer since there will be differences between the model and the printer due to the system noise. We could also have used a refinement step, discussed above, to improve the performance obtained by GA for color #2. We want to locally explore the solution obtained by GA so we evenly sweep both the magenta and yellow inputs leaving black and cyan at the values determined by GA. We purposely do that since we want to show 3-D plots to show the surfaces that these algorithms are trying to optimize.

For this next case, let u=[C M Y K Tf Tc], where Tf is the fuser's transfer current and Tc is the toner concentration. We use a model P to estimate the output X=[L* a* b* g m vs]. We use the GA algorithm for the same 10 spot colors with the same variables/settings as before. The only real change is that we use 6 inputs instead of 4. The Table of FIG. 8 shows the results obtained for this case. When we compare these results to those in the Table of FIG. 6, we see that the overall cost function, $J_T$, for each color has been minimized. This is due to the fact that there are more inputs available, which can be manipulated to minimize the multi-objective function. Observe that some deltaE2000 values in FIG. 8 are greater than the ones shown in FIG. 6, but all the m, g, and vs values are less than the ones shown in FIG. 8. These are trade-offs that can be modified with the weights. It is to be noted that, for this case, due to the use of additional process actuators Tf and Tc, we can only optimize for one spot color or a group of spot colors in the neighborhood.

As in the last case, we define the set points for each spot color by merging the L*, a*, and b* values along with the NMF, VS, and VNHF values obtained from GA in FIG. 8. We now run a controller after the results obtained in FIG. 8 to try to further improve those results. We design, this time, a Linear Quadratic Regulator (LQR) that has a diagonal matrix Q with the values $Q_{11}=Q_{22}=Q_{33}=5, Q_{44}=Q_{55}=Q_{66}=1$ and with R values $R_{11}=R_{22}=R_{33}=R_{44}=R_{55}=R_{66}=0.01$. We run the simulation for 20 iterations and the results are shown in the Table of FIG. 9. Notice that as in the previous case, the GA algorithm resulted in a good solution for most of the colors so the LQR algorithm has only been able to improve the performance of color #2. Again, the reason why the performance for the other colors has not been improved is because we are using the same model for both cases, LQR and GA, so that GA happened to find a minimum value that the LQR algorithm could not improve.

Optimization of Process Actuators and Color Recipes

Figure 10:
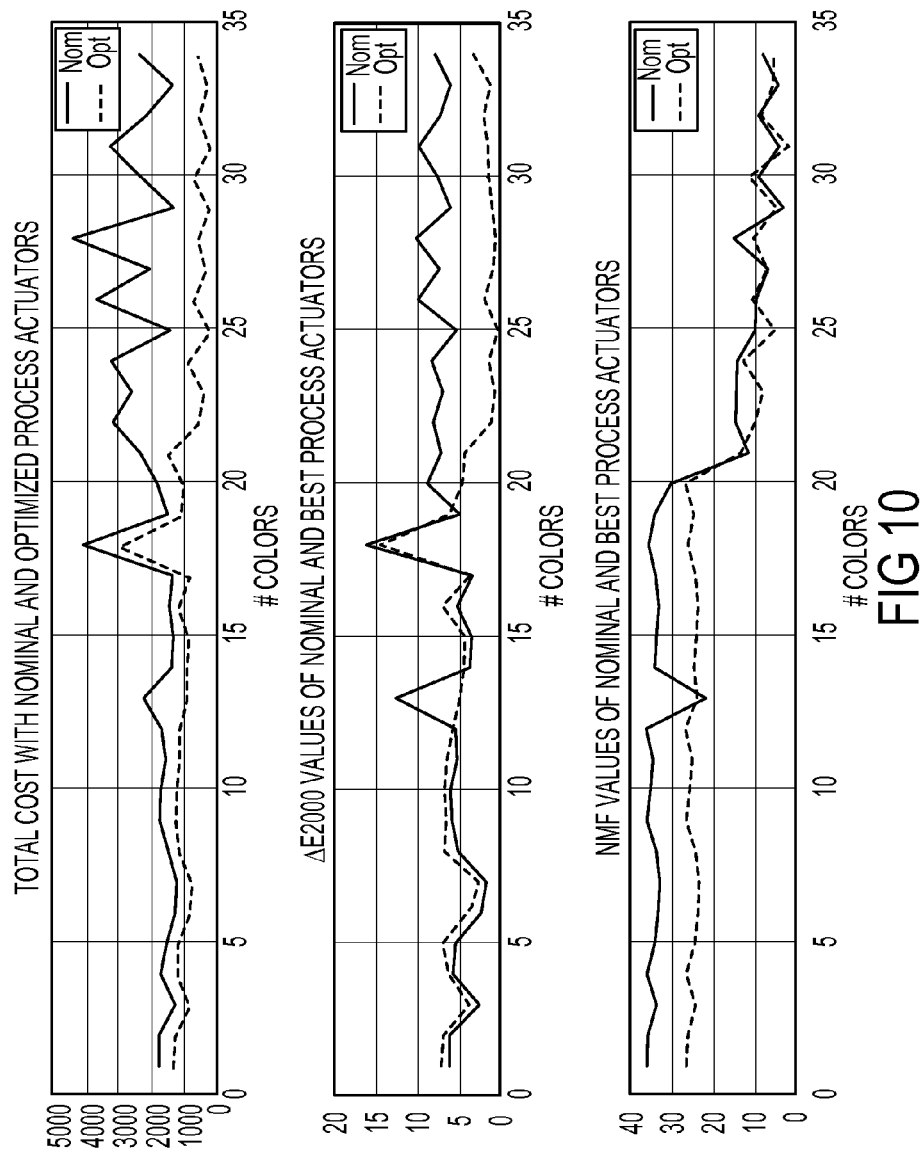
FIG. 10 shows results with nominal and optimal process actuator settings showing a comparison of cost function (top), accuracy (middle), and mottle level (bottom) for nominal and optimal process actuators.

Here we show how to apply the 2-step approach described above for improving the image quality attributes of a set of critical colors whose image quality attributes have maximum sensitivity to process parameters. For this case, 20 critical colors were selected plus 14 additional colors (located at the vertices of the gamut). The latter set of colors was selected to make sure that the gamut is not shrunk while optimizing the process actuators. The Simultaneous Perturbation Stochastic Approximation (SPSA) algorithm, as disclosed in the above-incorporated reference: "*An Overview of the Simultaneous Perturbation Method for Efficient Optimization*", is used in the first step. The input u=[ETAC FuseTemp XferCurrent TC TA] contains 5 elements to tune. The cost function for each color is as defined in Eq. (3) with $w^i_a=10, w^i_n=1$ for the 20 critical colors and $w^i_a=30, w^i_n=5$ for the remaining ones, and the optimization using $\|J_T\|$. The number of iterations to use for SPSA is 120, and the parameters used during the simulation were: $\lambda_0=0.007, \alpha_1=0.602, \alpha_2=0.101,$ and $c=0.01$. The initial CMYK values for each color were determined by an inverse printer model (ICC destination profile with max. GCR) under nominal setting of process set points. FIG. 10 shows the results with nominal and optimal process actuator settings. The top plot in FIG. 10 shows the individual cost, $J^i_T$, for each spot color where one can be seen that the cost has been minimized when the process actuators are optimized. The mid plot shows the cost of accuracy, $J^i_a$, for each color whereas the bottom plot shows the cost of mottle, $J^i_m$. The major factor contributing to the reduction of the cost $J^i_T$ for each spot is the minimization of the level of mottle for the first 20 colors (the ones more sensible to process set points). It is worthwhile to highlight that, for this simulation, the optimal process actuator values obtained using this method were located on the boundary of their feasible values, i.e., ETAC, the fuser temperature, the toner concentration, and the toner age were set at their minimum values while the transfer current was set to its maximum value. Other constraints required for normal machine operation may actually prevent us using these boundary set points. In such cases, the lower bound, L and upper bound, H are constrained further to a reasonable operating range.

Figure 11:
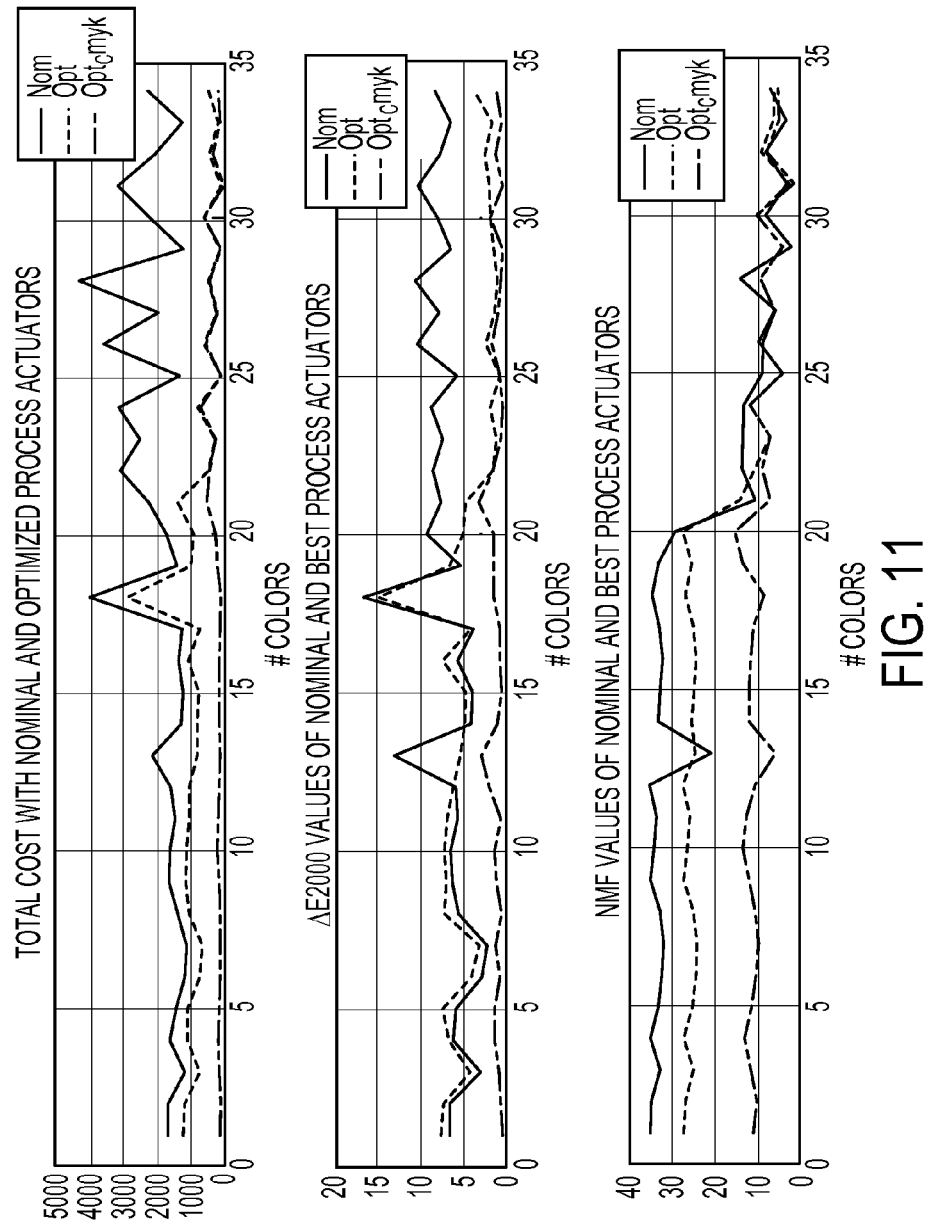
FIG. 11 shows a comparison of cost function (top), accuracy (mid), and mottle level (bottom) for nominal with initial colorant recipes, optimal process actuators with initial colorant recipes, and optimal process actuators and colorant recipes.

Next, we implement the second step by using genetic algorithms (GA) to seek for a solution $u^i_c$ that will minimize the cost for each spot color. This is carried out using the optimal process actuators obtained in the first step. FIG. 11 shows the results for the same $w^i_a$ and $w^i_m$ values used in the first step. Notice that by optimizing both variables, process actuators and colorant recipes, the color accuracy and the mottle levels have been remarkably reduced. Note also that it is expected that there is little or no improvement in some image quality attributes for colors #21-#34 since these colors are boundary colors and were chosen to regulate the printer gamut so that our algorithm does not excessively shrink the printer gamut. If desired, one can change to relative weighting in Eq. (3) to favor image quality attributes over printer gamut and vice versa. It should be appreciated that the teachings hereof can also be used to determine optimal media and halftone to maximize image quality attributes by choosing associated elements in the input vector u. This methodology is used as part of the setup procedure just before creating TRC linearization and custom profiling functions so that all other functions related to production printing can proceed normally.

Features or functionality of any of the above-described modules may comprise, in whole or in part, a special purpose computer which includes a special purpose processor capable of executing machine readable program instructions for carrying out one or more aspects of the present method. Such a special purpose computer may comprise, for example, a micro-processor, micro-controller, device driver, an electronic circuit, or an ASIC designed to perform some or all of the methods hereof. Such a special purpose computer can be integrated, in whole or in part, with for example, a xerographic system, a color management system, an image processing system, a digital front end (DFE), and the like. All or portions of the diagrams of the present system and method, as illustrated herein, may be implemented partially or fully in hardware in conjunction with machine executable instructions in communication with various components of such a system. The exact nature of the implementation will depend on the document processing environment wherein the present method finds its intended uses.

It should be appreciated that the functional block diagrams of FIGS. 1 and 3 are illustrative and that some or all of the functionality performed by any of the modules may be performed, in whole or in part, by a special purpose computer system. It should be appreciated that various modules may designate one or more components which may, in turn, comprise software and/or hardware designed to perform the intended function. Modules may further include one or more software modules which may further comprise an operating system, drivers, device controllers, and other apparatuses some or all of which may be connected via a network. It is also contemplated that one or more aspects of the present method may be implemented in distributed computing environments where tasks are performed by remote devices that are linked through a network.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a system, an operating system, a plug-in, or may be shipped, sold, leased, or otherwise provided separately either alone or as part of an add-on, update, upgrade, or product suite. It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A method for improving image quality in a color marking device, the method comprising:

selecting a set of spot colors of interest;

selecting a set of image quality attributes desired to be improved for said selected colors of interest;

adjusting set points for process actuators and color recipes of a color marking device such that a function of said image quality attributes is minimized when said selected colors of interest are rendered using said color marking device, wherein adjusting said process set points and said color recipes comprises using color and image quality attributes models which relate color recipe values and process actuators to image color and said image quality attributes; and rendering at least one of said spot colors using said color marking device.

2. The method of claim 1, wherein said set of image quality attributes includes color error and at least one of: graininess, mottle, and color stability.

3. The method of claim 1, wherein said process set points comprise any of: photoreceptor voltages, donor and magnetic roll voltages, fuser temperature, transfer current, toner concentration, media, and halftones.

4. The method of claim 1, wherein selecting said set of spot colors of interest comprises:

for each color within each group of colors of interest, using a color model to select all color recipe combinations that yield that color under different combinations of process set points;

passing each of said selected color recipe combinations through said image quality attributes model with their corresponding process set points to determine sensitivity of said image quality attributes to said process set points;

ranking said colors based on each color's determined sensitivity; and selecting a subset of said colors based upon their ranking.

5. The method of claim 4, wherein said group of colors of interest comprises a uniformly sampled set of in-gamut colors.

6. The method of claim 1, wherein said function of image quality attributes comprises a weighted sum of the individual cost functions of image quality attributes desired to be improved for the $i^{th}$ color of interest.

7. The method of claim 6, wherein said individual cost function for the i$^{tb}$ color comprises:

$$J_T^i = \sum_e \left[ w_e^i * (J_e^i - J_e^{id})^2 \right]$$

where w$^i_e$ is a weight assigned to a cost associated with the image quality attributes selected for the i$^{tb}$ color, J$'_e$ represents a cost associated with the image quality attributes, and J$^{id}_e$ represents a cost desired to be achieved for the i$^{tb}$ color.

8. The method of claim 7, further comprising minimizing $\|J_T\|$ where $J_T$ is a vector containing individual cost functions $$[J_T^1, J_T^2, \ldots, J_T^M]$$

for M colors requiring improvement with respect to said image quality attributes.

9. The method of claim 1, further comprising selecting, in addition to said spot color of interest, colors at the vertices of a gamut of said color marking device such that the overall gamut volume is not reduced.

10. A feedback control system for improved spot color rendition on a color marking device, the system comprising:
a memory and a storage medium; and
a processor in communication with said storage medium and said memory, said processor executing machine readable instructions for performing the method of:
selecting a set of spot colors of interest;
selecting a set of image quality attributes desired to be improved for said selected spot color of interest; and
adjusting set points for process actuators and color recipes of a color marking device such that a function of said image quality attributes is minimized when said selected color of interest is rendered using said color marking device, wherein adjusting said process set points and said color recipes comprising using color and image quality attributes models which relate color recipe values and process actuators to image color and said image quality attributes.

11. The feedback control system of claim 10, wherein said set of image quality attributes includes color error and at least one of: graininess, mottle, and color stability.

12. The feedback control system of claim 10, wherein said process set points comprise any of: photoreceptor voltages, donor and magnetic roll voltages, fuser temperature, transfer current, toner concentration, media, and halftones.

13. The feedback control system of claim 10, wherein selecting said set of spot colors of interest comprises:
for each color within each group of colors of interest, using a color model to select all color recipe combinations that yield that color under different combinations of process set points;
passing each of said selected color recipe combinations through said image quality attributes model with their corresponding process set points to determine sensitivity of said image quality attributes to said process set points;
ranking said colors based on each color's determined sensitivity; and
selecting a subset of said colors based upon their ranking.

14. The feedback control system of claim 13, wherein said group of colors of interest comprises a uniformly sampled set of in-gamut colors.

15. The feedback control system of claim 10, further comprising selecting, in addition to said spot color of interest, colors at the vertices of a gamut of said color marking device such that the overall gamut volume is not reduced.

16. The feedback control system of claim 10, wherein said function of image quality attributes comprises a weighted sum of the individual functions determined for each image quality attribute desired to be improved for said spot color of interest.

17. The feedback control system of claim 16, wherein said individual cost function for the i$^{tb}$ color comprises:

$$J_T^i = \sum_e \left[ w_e^i * (J_e^i - J_e^{id})^2 \right]$$

where w$^i_e$ is a weight assigned to a cost associated with the image quality attributes selected for the i$^{tb}$ color, J$_e^i$ represents a cost associated with the image quality attributes, and J$_e^{id}$ represents a cost desired to be achieved for the i$^{tb}$ color.

18. The feedback control system of claim 17, further comprising minimizing $\|J_T\|$ where $J_T$ is a vector containing individual cost functions $$[J_T^1, J_T^2, \ldots, J_T^M]$$

for M colors requiring improvement with respect to said image quality attributes.

19. A method for improved spot color rendition in a color marking device, the method comprising:
selecting a spot color of interest;
selecting a set of image quality attributes desired to be improved for said selected spot color of interest;
generating a vector u comprising a color recipe for said selected spot color of interest and associated process set points of said color marking device;
modifying vector u such that u minimizes a function of image quality attributes $J_T$ where each element in vector u satisfies L≦u≦H, where L and H are lower and upper bounds respectively, said modification of vector u being based upon any of: a printer model of said color marking device, and measurements obtained from said color marking device; and
storing said modified vector to a storage media.

20. The method of claim 19, wherein said set of image quality attributes includes color error and at least one of: graininess, mottle, and color stability.

21. The method of claim 19, wherein said process set points comprise any of: a photoreceptor voltage, donor and magnetic roll voltages, fuser temperature, transfer current, toner concentration, media, and halftones.

22. The method of claim 19, wherein said function comprises:

$$J_T = \sum_e \left[ w_e * (J_e - J_e^d)^2 \right]$$

where w$_e$ is a weight assigned to a cost associated with the image quality attributes selected for the selected color, J$_e$ represents a cost associated with the image quality attributes selected for the selected color, and J$_e^d$ represents a cost desired to be achieved for the selected color.

* * * * *